E. B. NULL.
SEED-DROPPING PLATE FOR GRAIN-DRILLS.

No. 184,418. Patented Nov. 14, 1876.

UNITED STATES PATENT OFFICE.

EPHRAIM B. NULL, OF OXFORD, OHIO.

IMPROVEMENT IN SEED-DROPPING PLATES FOR GRAIN-DRILLS.

Specification forming part of Letters Patent No. 184,418, dated November 14, 1876; application filed October 14, 1876.

*To all whom it may concern:*

Figure 1:
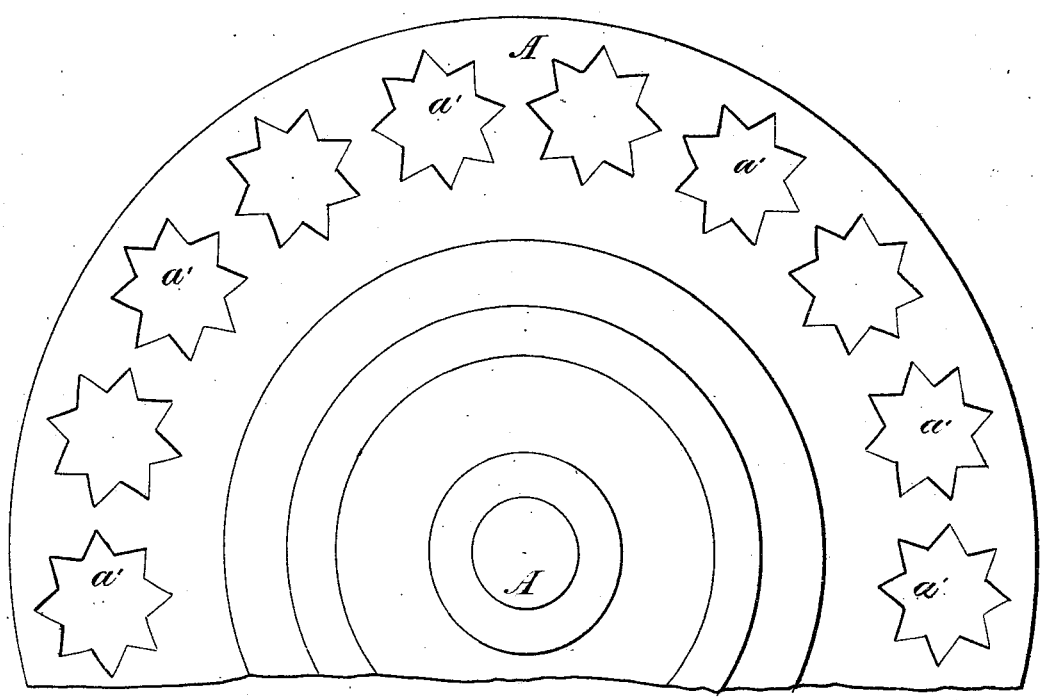
Figure 2:
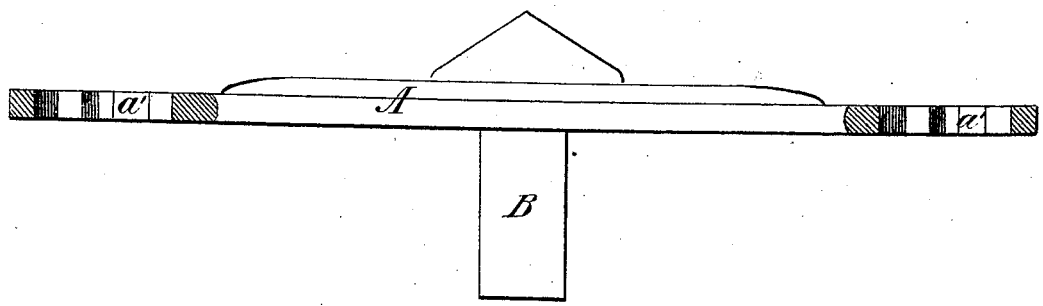

Be it known that I, EPHRAIM BIGGS NULL, of Oxford, in the county of Butler and State of Ohio, have invented a new and useful Improvement in Seed-Dropping Plates for Grain-Drills, of which the following is a specification:

Figure 1 is a top view of a part of one of my improved seed-dropping plates. Fig. 2 is a side view of the same, parts being broken away to show the construction.

Similar letters of reference indicate corresponding parts.

The object of this invention is to furnish seed-dropping plates for grain-drills, which shall be so constructed as to drop one grain at a time, whether the kernels be large or small.

The invention consists in a seed-dropping plate, in which the holes are notched around their periphery, or are made star-shaped, to adapt them to receive large or small kernels, as hereinafter fully described.

A represents the seed-dropping plate, and B the pivot upon which it turns. In the plate A, near its edge, is formed a circle of holes, $a'$, to receive the grain, remove it from the seed-box, and drop it to the ground. The holes $a'$ are made of the right size to drop small kernels one at a time, and then are notched around their periphery, or made star-shaped, as shown in Fig. 1, so as to allow large kernels to drop in, but will not allow two kernels to enter the same hole at the same time.

Having thus described my invention, I claim as new and desire to secure by Letters Patent—

A seed-dropping disk or plate, A, having a series of star-shaped openings, $a'$, substantially as and for the purpose set forth.

EPHRAIM BIGGS NULL.

Witnesses:
B. B. DAVIS,
JAMES M. WALKER.